(12) United States Patent
Kim et al.

(10) Patent No.: US 7,898,639 B2
(45) Date of Patent: Mar. 1, 2011

(54) POLYMER DISPERSED LIQUID CRYSTAL DISPLAY WITH LIGHT EMITTED LAYER ON THE SUBSTRATE AND METHOD OF FABRICATING THE SAME

(75) Inventors: Jinmog Kim, Kyungbuk (KR); Hoansu Shim, Incheon (KR)

(73) Assignee: LG Display Co., Ltd., Seoul (KR)

( * ) Notice: Subject to any disclaimer, the term of this patent is extended or adjusted under 35 U.S.C. 154(b) by 473 days.

(21) Appl. No.: 12/003,630

(22) Filed: Dec. 28, 2007

(65) Prior Publication Data

US 2008/0239198 A1    Oct. 2, 2008

(30) Foreign Application Priority Data

Apr. 2, 2007   (KR) .................... 10-2007-0032283

(51) Int. Cl.
   *C09K 19/02*   (2006.01)
   *G02F 1/1335*  (2006.01)
   *G02F 1/1333*  (2006.01)

(52) U.S. Cl. .................... 349/183; 349/69; 349/70; 349/71; 349/86; 349/88; 349/89; 349/90

(58) Field of Classification Search .................... 349/86, 349/88–92, 183, 69–71, 42–43; 257/59, 257/72; 345/92
See application file for complete search history.

(56) References Cited

U.S. PATENT DOCUMENTS

| | | | |
|---|---|---|---|
| 6,542,145 B1 * | 4/2003 | Reisinger et al. | 345/102 |
| 7,687,404 B2 * | 3/2010 | Yamazaki et al. | 438/705 |
| 2003/0184692 A1 * | 10/2003 | Nagae | 349/86 |

* cited by examiner

*Primary Examiner*—Hoan C Nguyen
(74) *Attorney, Agent, or Firm*—Morgan, Lewis & Bockius LLP

(57) ABSTRACT

There are provided a polymer dispersed liquid crystal (PDLC) display not using a backlight unit and a method of fabricating the same. The PDLC display comprises a rear substrate over which a thin film transistor (TFT), a first electrode, and a second electrode are formed, a front substrate apart from the rear substrate and having a first black matrix formed thereon corresponding to a region where the TFT is formed, a PDLC layer disposed below the first black matrix and formed between the front and rear substrates, a light source formed on one side of the PDLC layer and configured to provide light to the side of the PDLC layer, and a first reflection plate formed on the other side of the PDLC layer and configured to reflect light incident via the PDLC layer.

19 Claims, 10 Drawing Sheets

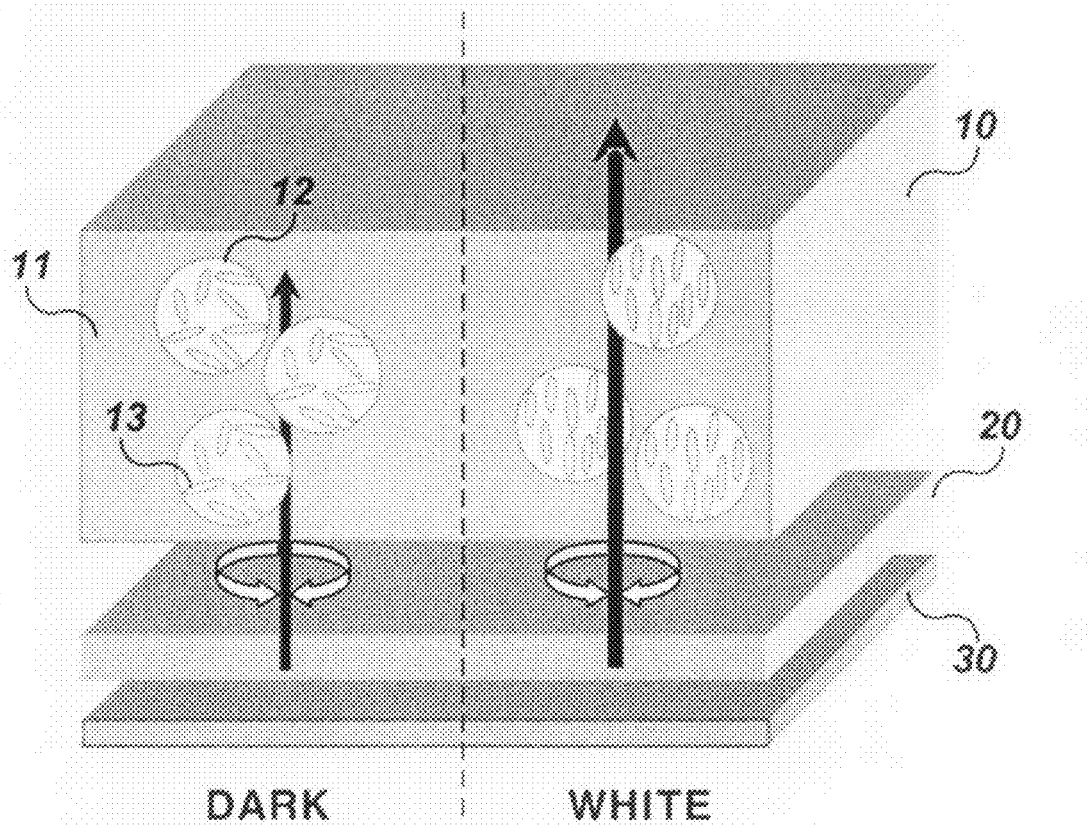

US 7,898,639 B2

POLYMER DISPERSED LIQUID CRYSTAL DISPLAY WITH LIGHT EMITTED LAYER ON THE SUBSTRATE AND METHOD OF FABRICATING THE SAME

CROSS-REFERENCE TO RELATED APPLICATION

The present application claims priority under 35 U.S.C. §119 to Korean Patent Application No. 10-2007-0032283 filed on Apr. 2, 2007, which is hereby incorporated by reference in its entirety.

BACKGROUND

1. Field

This document relates to a polymer dispersed liquid crystal (PDLC) display and a method of fabricating the same.

2. Related Art

In general, a liquid crystal display (LCD) is an apparatus for representing images by employing the optical anisotropy and birefrigence properties of liquid crystal molecules, and generally employs a thin film transistor (TFT) LCD using a TFT as a switching element.

However, in a general LCD, a polarized plate must be used, and about 70% to 80% of a total amount of light incident from a backlight unit is substantially lost and then displayed to the outside. For this reason, the LCD is problematic in that it has low optical efficiency and has problems, such as optical scattering and/or phase distortion due to an orientation process.

To solve the problems, a PDLC display has been proposed. PDLC is one of liquid crystal cells used in a LCD, and is characteristic in that the transmittance of light is controlled according to the scattering intensity and the polarized plate is not required. There have been proposed several kinds of PDLC structures, such as one in which a plurality of liquid crystal molecule particles of several mm in size are dispersed in a polymer material and one in which liquid crystals are comprised in a net-shape polymer. That is, the PDLC display is a device in which the liquid crystal material and materials other than the liquid crystals are dispersed irregularly and it is operated using the difference in the refractive index between the two materials.

If a voltage is not applied to the PDLC display, the direction of the liquid crystal molecules becomes irregular and scattering is generated at the interface in which the refractive index of the liquid crystal molecules is different from that of a medium. However, if a voltage is applied to the PDLC display, the direction of the liquid crystal molecules is orderly arranged and it results in a transmission state because the refractive index of the liquid crystal molecules is identical to that of the medium. At this time, if the thickness of the liquid crystal cell is not large enough, sufficient luminance is not secured, leading to a high driving voltage.

The PDLC display can be fabricated easily because it does not require an orientation film and a polarized plate and has flexibility. Further, the PDLC display can be used for large-sized display devices and projection TV because of an excellent luminance characteristic.

FIG. 1 is a schematic construction of a general PDLC display.

Referring to FIG. 1, a general PDLC display comprises a PDLC 10, a backlight unit 20, and a reflection plate 30. The PDLC 10 comprises a polymer matrix 11 and micro liquid crystal droplets 12. Liquid crystal molecule particles 13 are intervened in the micro liquid crystal droplets 12 in a capsule shape.

In the PDLC 10, in an off state (that is, when a voltage is not applied), micro liquid crystal droplets are arranged randomly and therefore light is scattered because of the refraction between the micro liquid crystal droplets 12 and the polymer matrix 11, thereby implementing a dark state. However, in an on state (that is, when a voltage is applied), the micro liquid crystal droplets are arranged in a row and therefore the difference in the refractive index between the micro liquid crystal droplets 12 and the polymer matrix 11 is reduced, so a liquid crystal cell transmits light, thereby implementing a white state.

A detailed method of implementing the dark state and the white state of the PDLC display is described below.

FIGS. 2a and 2b are views illustrating a detailed operation principle of the PDLC display of FIG. 1.

Referring to FIGS. 2a and 2b, the PDLC display comprises a rear substrate 14 equipped with a first driving electrode 16, and a front substrate 15 equipped with a second driving electrode 17. The rear substrate 14 and the front substrate 15 are opposite apart from each other at a predetermined distance. A polymer matrix 11 in which nematic liquid crystal molecule particles 13 are arranged within respective micro liquid crystal droplets 12 is intervened between the rear substrate 14 and the front substrate 15.

In the conventional PDLC display constructed as above, when a voltage is not applied between the first driving electrode 16 and the second driving electrode 17, incident light is all scattered because of the difference in the refractive index between the micro liquid crystal droplets 12 and the polymer matrix 11 as shown in FIG. 2a, thereby implementing the dark state. In other words, as shown in FIG. 2a, before an electric field is formed between the first and second driving electrodes 16 and 17, the liquid crystal molecule particles 13 within the micro liquid crystal droplets 12 are arranged randomly because of the absence of the orientation film. Accordingly, incident light is scattered while passing through the polymer matrix 11, thereby implementing the dark state.

On the other hand, if a power supply unit 18 applies a voltage between the first driving electrode 16 and the second driving electrode 17, the liquid crystal molecule particles 13 within the micro liquid crystal droplets 12 have their long axes arranged parallel to an electric field E, as shown in FIG. 2b. Thus, incident light transmits the polymer matrix 11, thus implementing the white state. That is to say, when the electric field E is formed between the first and second driving electrodes 16, 17, the liquid crystal molecule particles 13 within the micro liquid crystal droplets 12 have their long axes arranged parallel to the electric field E. As the liquid crystal molecule particles 13 are arranged parallel to the electric field E in one direction, the white state is implemented.

The conventional PDLC display has a high transmission and a perfect visual field characteristic, but is limited that the dark state is implemented by only random scattering of light by micro liquid crystal (LC) droplets arranged in a random direction, which exist within a polymer. Further, the conventional PDLC display requires a little high driving voltage and thus requires the development of a liquid crystal material and process for solving the high driving voltage.

Meanwhile, the conventional LCD and PDLC displays must use a backlight unit for providing a light source and also requires a reflection plate and a spreading plate. Due to this, there are problems in which the thickness of the display is thick and the manufacturing cost is increased.

SUMMARY

In an aspect of this document, a PDLC display comprises a rear substrate over which a thin film transistor (TFT), a first electrode, and a second electrode are formed, a front substrate apart from the rear substrate and having a first black matrix formed thereon corresponding to a region where the TFT is formed, a PDLC layer disposed below the first black matrix and formed between the front and rear substrates, a light source formed on one side of the PDLC layer and configured to provide light to the side of the PDLC layer, and a first reflection plate formed on the other side of the PDLC layer and configured to reflect light incident via the PDLC layer.

In another aspect of this document, a method of fabricating a PDLC display comprises forming a black matrix on a front substrate, forming a light source formed on one side of the black matrix and configured to provide lateral light to the one side of the black matrix, forming a PDLC layer corresponding to the black matrix on the front substrate, forming a TFT, a pixel electrode, and a common electrode over a rear substrate, forming a reflection plate over the rear substrate, and coalescing the front substrate over which the light source and the PDLC layer are formed, and the rear substrate on which the reflection plate is formed.

In still another aspect of this document, a method of fabricating a PDLC display comprises forming a black matrix on a front substrate, forming a light source formed on one side of the black matrix and configured to provide lateral light to the one side of the black matrix, forming a TFT, a pixel electrode, and a common electrode over a rear substrate, forming a reflection plate over the rear substrate, forming a PDLC layer corresponding to the black matrix and provided over the rear substrate, and coalescing the front substrate on which the light source is formed and the rear substrate over which the reflection plate and the PDLC layer are formed.

In further still another aspect of this document, a method of fabricating a PDLC display comprises forming a black matrix on a front substrate, forming a light source formed on one side of the black matrix and configured to provide lateral light to the one side of the black matrix, forming a reflection plate on the other side of the black matrix, forming a PDLC layer corresponding to the black matrix on the front substrate, forming a TFT, a pixel electrode, and a common electrode over a rear substrate, and coalescing the front substrate over which the light source, the reflection plate, and the PDLC layer are formed, and the rear substrate.

In further still another aspect of this document, a method of fabricating a PDLC display comprises forming a black matrix on a front substrate, forming a light source formed on one side of the black matrix and configured to provide lateral light to the one side of the black matrix, forming a reflection plate on the other side of the black matrix, forming a TFT, a pixel electrode, and a common electrode over a rear substrate, forming a PDLC layer corresponding to the black matrix and provided over the rear substrate, and coalescing the front substrate over which the light source and the reflection plate are formed and the rear substrate on which the PDLC layer is formed.

BRIEF DESCRIPTION OF THE DRAWINGS

The implementation of this document will be described in detail with reference to the following drawings in which like numerals refer to like elements.

FIG. 1 is a schematic construction of a general PDLC display;

DETAILED DESCRIPTION

The merits and characteristics of the invention, and methods for accomplishing them will become more apparent from the following embodiments taken in conjunction with the accompanying drawings. The same reference numbers will be used throughout the drawings to refer to the same or like parts.

Hereinafter, a PDLC display and a method of fabricating the same according to embodiments of this document will be described in detail with reference to the attached drawings.

Major characteristics of a PDLC display and a method of fabricating the same according to embodiments of this document may comprise two things. Firstly, the PDLC display is not formed on a front surface of a liquid crystal layer between a front substrate and a rear substrate as in the prior art, but is formed only below a black matrix. Secondly, a light source which is a self-illuminant is formed on the side of a PDLC layer instead of using the existing backlight unit.

A variety of embodiments according to this document are described below based on the above two characteristics.

Figure 2A:
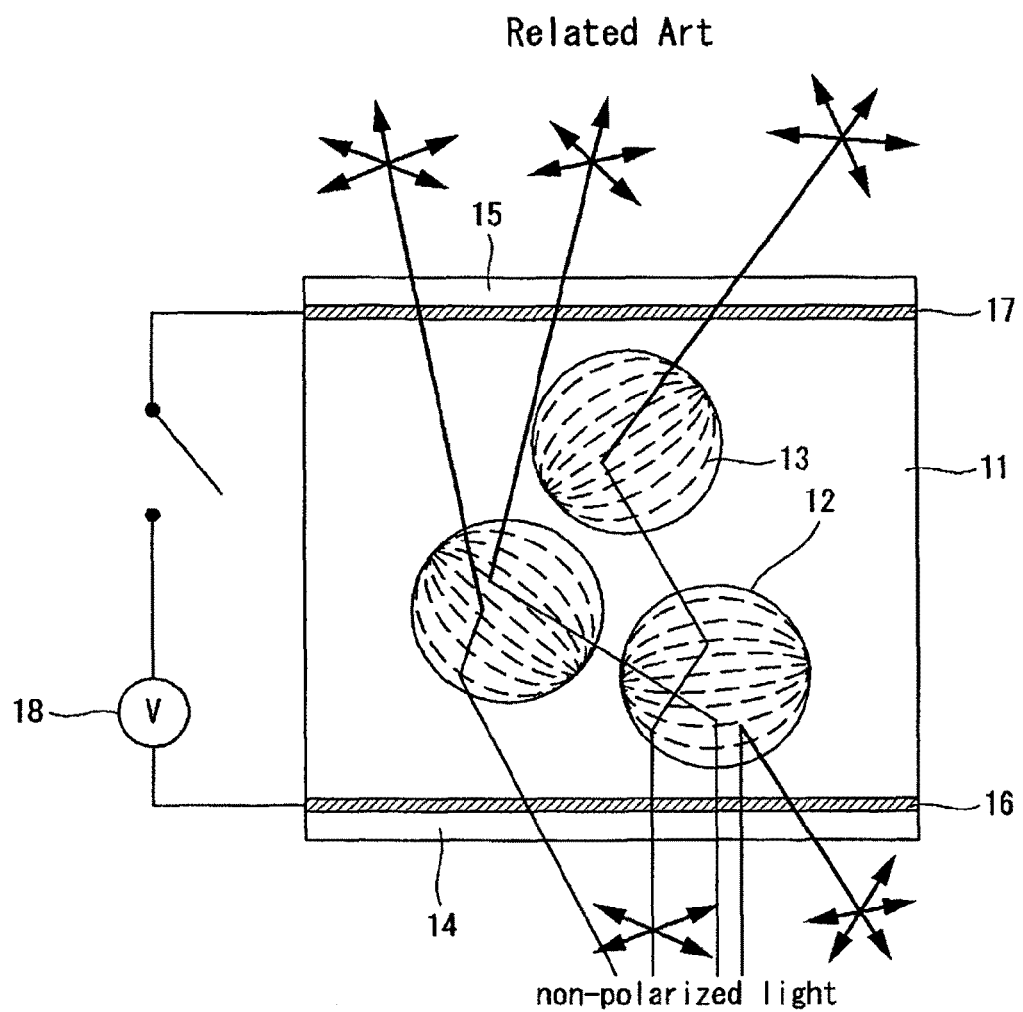
FIGS. 2a and 2b are views illustrating a detailed operation principle of the PDLC display of FIG. 1.
Figure 2B:
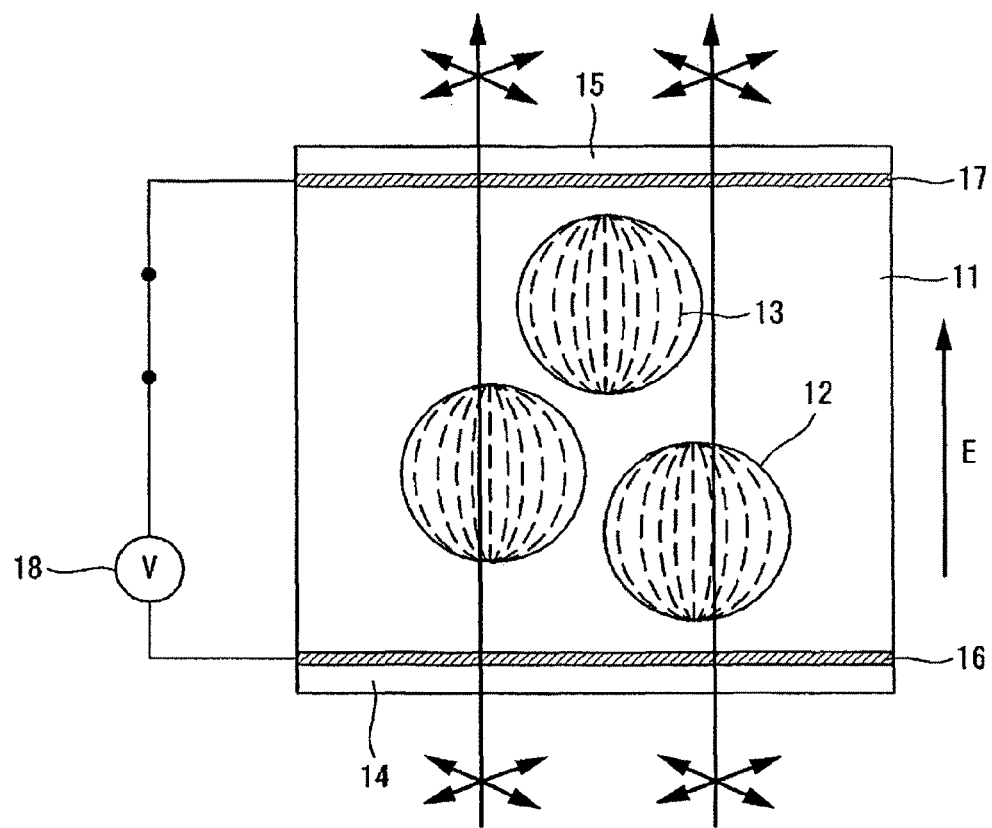
Figure 3:
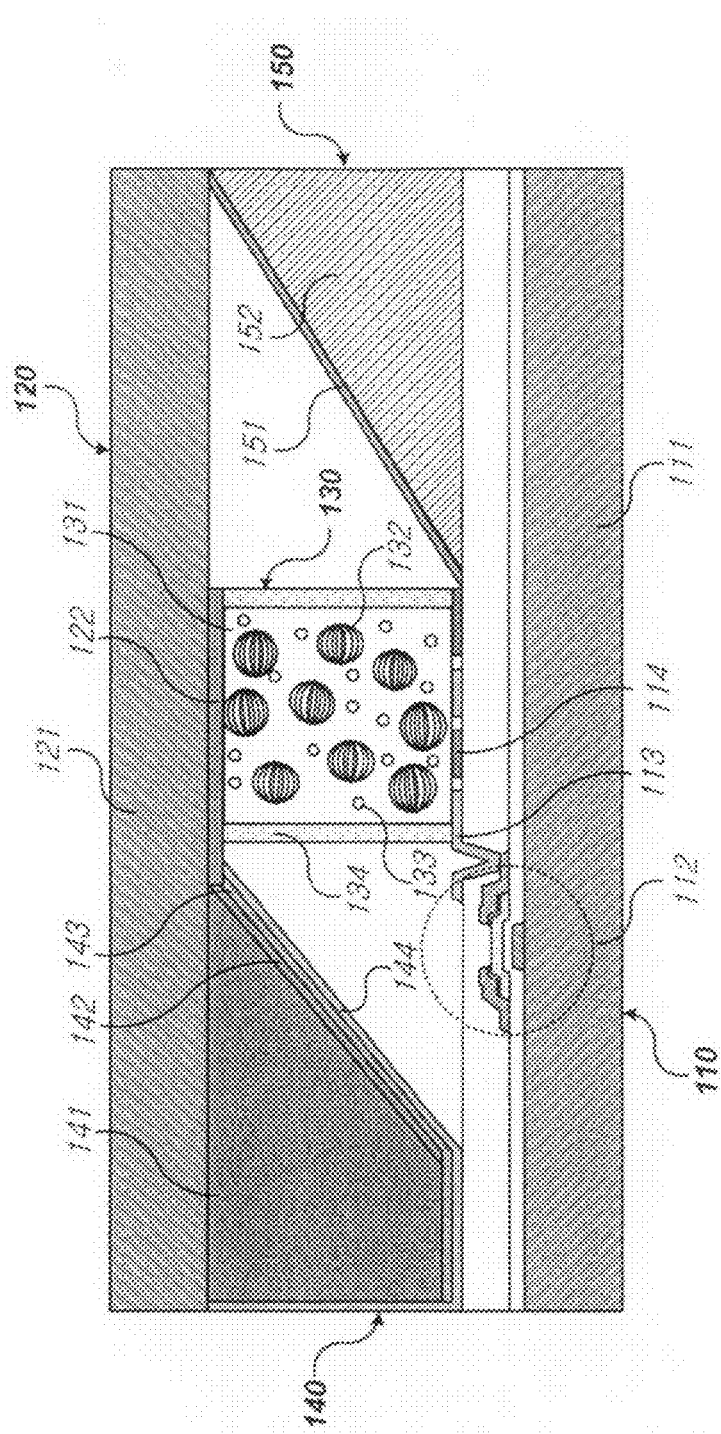
FIG. 3 is a vertical sectional view of a PDLC display according to a first embodiment of this document.

FIG. 3 is a vertical sectional view of a PDLC display according to a first embodiment of this document.

Referring to FIG. 3, a PDLC display according to a first embodiment of this document comprises a rear substrate 110, a front substrate 120, a PDLC layer 130, a light source 140, and a first reflection plate 150.

The rear substrate 110 comprises a TFT 112, a pixel electrode 113, and a common electrode 114, which are formed over a glass substrate 111. The TFT 112 is formed using the same method as that of a general LCD and detailed description thereof is omitted.

The pixel electrode 113 and the common electrode 114 function to generate a horizontal electric field in the PDLC layer 130. A method of generating the horizontal electric field is substantially the same as that of an in-plane switching mode LCD and detailed description thereof is omitted.

The front substrate 120 comprises a first black matrix 122. The first black matrix 122 functions to prevent light which passes through the PDLC layer 130 from proceeding in the direction of the front substrate 120.

The PDLC layer 130 is disposed below the first black matrix 122 and is formed between the front and rear substrates 110 and 120. The PDLC layer 130 may be formed by dropping using, for example, an inkjet method. The PDLC layer 130 is dropped in a fluid state between photoresist walls 134 formed on both sides of the PDLC layer and then subsequently cured through a curing process. The photoresist walls 134 may be formed from a transparent material.

The PDLC layer 130 may have a projection shape for forming a cell gap. The PDLC layer according to an embodiment of this document is formed in the projection form and serves as a gap spacer, so that the cell gap sustainability can be improved.

The PDLC layer 130 may comprise a polymer matrix 131, micro liquid crystal droplets 132 dispersed within the polymer matrix, and liquid crystal molecule particles intervened within the micro liquid crystal droplets in a capsule shape. The PDLC layer 130 may further comprise pigment particles 133 which are added within the polymer matrix 131 and configured to represent colors.

The light source 140 may comprises a second black matrix 141, a second reflection plate 142, a light-emitting layer 143 and an indium tin oxide (ITO) layer 144 and is disposed on one side of the PDLC layer 130. The light source 140 serves as an existing backlight unit.

The light-emitting layer 143 is a self-illuminant, and it may employ, for example, an organic electroluminescent light-emitting diode (OLED), but not limited thereto. If the OLED is used as the light-emitting layer 143, an electrode (not shown) for applying an additional power source may be needed. Further, if a power source is applied to the light-emitting layer 143 in order to emit light, the light-emitting layer 143 may be driven in conjunction with the switching operation of the TFT 112.

The second black matrix 141 functions to block light emitted from the light-emitting layer 143, and may be formed simultaneously when the first black matrix 122 of the front substrate 120 is formed.

The second reflection plate 142 is attached to the side of the second black matrix 141 inclinedly with respect to the front substrate 120 and functions to reflect light emitted from the light-emitting layer 143, thus increasing the efficiency of light emitted from the light-emitting layer 143.

The ITO layer 144 may be used as a first transparent electrode for protecting the light-emitting layer 143 or applying a power source to the light-emitting layer 143.

An empty space is provided from the top of the TFT 112 to the light source 140 and may have a vacuum state. That is, the empty space may be formed in a vacuum state in order to guarantee the lifespan of the light source 140.

The first reflection plate 150 may comprise a floating metal 151 of a non-electrode property and a support layer 152 for supporting the floating metal 151. The floating metal 151 is inclined with respect to the front substrate 120 and is not directly applied with an external voltage. For example, the floating metal 151 may be made of aluminum (Al) and the support layer 152 may be made of transparent resin. The floating metal 151 is a reflector and functions to reflect light, which is incident in a horizontal direction through the PDLC layer 130. The reflected light is then displayed to the outside through the front substrate 120.

If a voltage is applied between the pixel electrode 113 and the common electrode 114 shown in FIG. 3, the PDLC layer 130 becomes an on state and therefore light provided from the light source 140 proceeds to the PDLC layer 130 and the first reflection plate 150.

However, if a voltage is not applied between the pixel electrode 113 and the common electrode 114, the PDLC layer 130 becomes an off state and therefore light provided from the light source 140 is blocked by the PDLC layer.

Figure 4A:
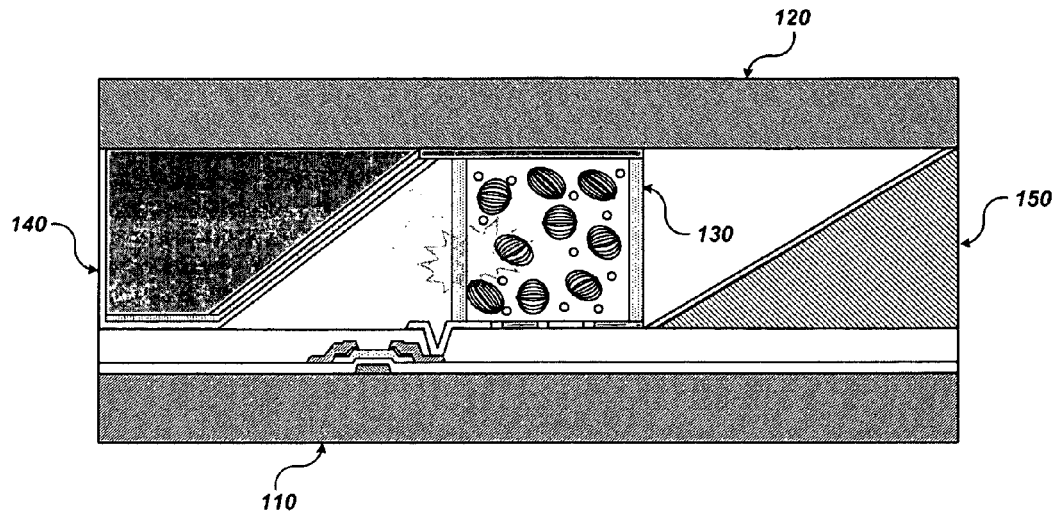
FIGS. 4a and 4b are views illustrating an off state and an on state of the PDLC display according to the first embodiment of this document.
Figure 4B:
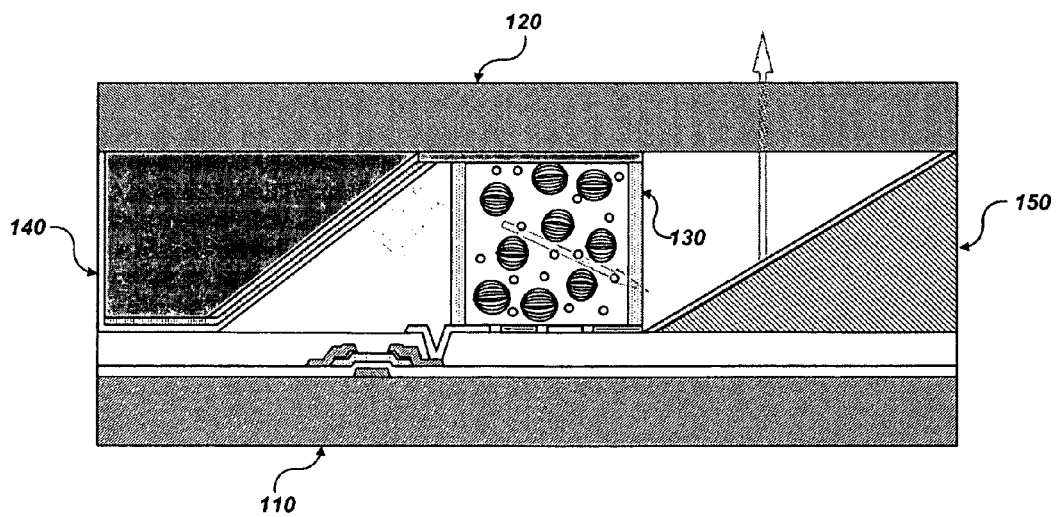

FIGS. 4a and 4b are views illustrating the off state and the on state of the PDLC display according to the first embodiment of this document.

Referring to FIGS. 4a and 4b in conjunction with FIG. 3, in the PDLC display according to the first embodiment of this document, if light is emitted from the light-emitting layer 143 of the light source 140, the emitted light is incident on the PDLC layer 130 in a lateral direction. At this time, the second reflection plate 142 functions to increase the efficiency of the incident light.

If a horizontal electric field is generated in the rear substrate 110, the light transmittance of the micro liquid crystal droplets 132 dispersed in the polymer matrix 131 can be changed. The micro liquid crystal droplets 132 dispersed in the polymer matrix 131 may be dropped using an inkjet method and then fixed on the rear substrate 110 using a UV curing process.

The micro liquid crystal droplets 132 are dispersed in the polymer matrix 131 in a capsule shape, thus forming liquid crystal molecule particles. If a horizontal electric field is generated by applying a voltage between the pixel electrode 113 and the common electrode 114, the orientation of the molecules is changed.

The liquid crystal molecule particles have a transparent structure, but are not dissolved each other. If two kinds of liquids with different refractive indices are mixed forcedly, the entire liquids become a white opaque cream shape. This phenomenon is generated because each liquid of the mixed state becomes opaque and light is also generated at the interface when it passes through the interface due to the difference in the refractive index between the two liquids.

If the micro liquid crystal droplets 132 are formed in a micro capsule shape and dispersed in the polymer matrix 131, incident light is all scattered because of the difference in the refractive index between the liquid crystal molecule particles and the polymer matrix 131 when a voltage is not applied as shown in FIG. 4a. Thus, the micro liquid crystal droplets 132 become a milk-white opaque state.

However, if an external voltage is applied, the micro liquid crystal droplets 132 of the liquid crystal molecule particles are oriented in a horizontal electric field direction as shown in FIG. 4b. Thus, the refractive index between the micro liquid crystal droplets 132 and the polymer matrix 131 become constant in the entire particles. At this time, if the refractive index of the polymer matrix 131 (that is, a dispersion catalyst) is identical to that of the micro liquid crystal droplets 132, scattering is not generated at the interface of the polymer matrix 131 and the micro liquid crystal droplets 132 and the interface is seen transparent.

Accordingly, the PDLC display can be used as a display device whose transmittance is varied according to on/off of a voltage.

In general, in the PDLC display, the micro liquid crystal droplets 132 of 1 to 2 μm in diameter are dispersed in polymer films having various thickness. If the PDLC film is inserted between two transparent electrodes and an electric field is then applied to the PDLC film, the director of the liquid crystals is oriented in the direction of an electric field. At this time, when the refractive index of the liquid crystals is identical to that of the polymer, the film becomes transparent due to the light transmission.

In the first embodiment of this document, however, the method of inserting the PDLC film between the two transparent electrodes and then applying an electric field is not used, but an in-plane switching mode is used as in a general in-plane switching mode LCD and the PDLC layer is formed only below the black matrix. Accordingly, not only the use of the PDLC layer can be reduced, but also the dark state can be implemented easily. In other words, the black matrix 122 formed on the front substrate 120 functions to block light and the path of light extends along the light source 140, the PDLC layer 130, and the first reflection plate 150. Thus, when a voltage is not applied, the dark state can be implemented easily.

More specifically, if the electric field is removed, the director of the liquid crystal molecule particles is disordered because of surface anchoring energy and a valid refractive index of the liquid crystal molecule particles becomes significantly different from that of the polymer. Thus, the film becomes opaque by optical scattering at the interface because of a mismatch in the refractive index between the liquid crystal molecule particles and the polymer, so the dark state can be implemented.

Figure 5:
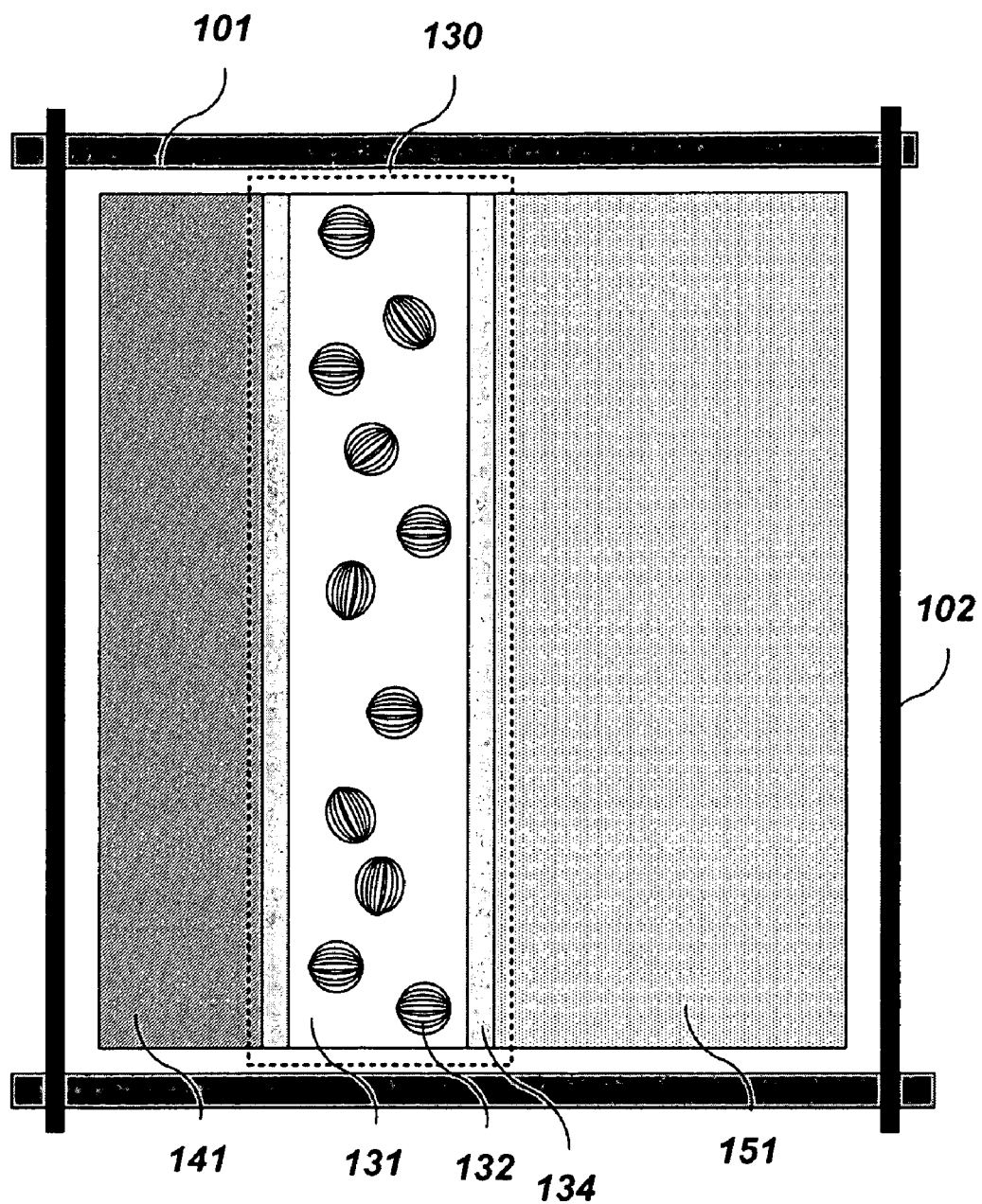
FIG. 5 is a view schematically showing a plan structure of the PDLC display according to the first embodiment of this document.

FIG. 5 is a view schematically showing a plan structure of the PDLC display according to the first embodiment of this document.

Referring to FIGS. 3 and 5, reference numerals 101 and 102 denote a gate line and a data line, respectively. One sub pixel is defined in a region where the gate line intersects the data line. A reference numeral 130 denotes the PDLC layer comprising the polymer matrix 131, the micro liquid crystal droplets 132, and the photoresist walls 134. The PDLC layer 130 is not actually seen from the outside because the first black matrix 122 of the front substrate 120 is formed on the PDLC layer 130, but is shown for convenience of description. Further, the second black matrix 141 is formed on the light source 140 and the floating metal 151 (that is, aluminum (Al)) of the first reflection plate 150 is formed on the side of the PDLC layer 130.

In an off state, light provided from the light source 140 does not pass through the PDLC layer 130, resulting in not being a micro projection, so that the dark state can be represented.

Accordingly, black is represented in the non-reflective state of the floating metal 151 (that is, aluminum (Al)) since lateral light is fully blocked. Consequently, a sharp color tone can be represented.

In an on state, light is emitted to the outside through the light source 140, the PDLC layer 130, and the first reflection plate 150. When light provided from the light source 140 passes through the inside of the PDLC layer 130, a high quality of on/off switching is possible and simplified characteristics are obtained in terms of the design, process, and material because the PDLC layer 130, serving as a micro shutter on which lateral light is incident, controls the amount of light.

In other words, in the on state, the PDLC layer 130 with a constant directivity is formed by a horizontal electric field. Thus, a micro projection is implemented with respect to the light provided from the light source 140, so the white state can be represented. At this time, it is necessary to select materials so that the refractive index of the PDLC in a short axis direction is identical to that of polymer.

The ratio in the area between a portion on which light is incident and a portion on which light is displayed and the tilt angle of the first reflection plate 150 and the second reflection plate 142 may be varied according to the efficiency of reflected light and optical characteristic requirements.

In addition, when sufficient color tone representation is required, the color sense can be corrected by controlling the type and content of a pigment solution of pigment components added to the PDLC layer 130.

Figure 6:
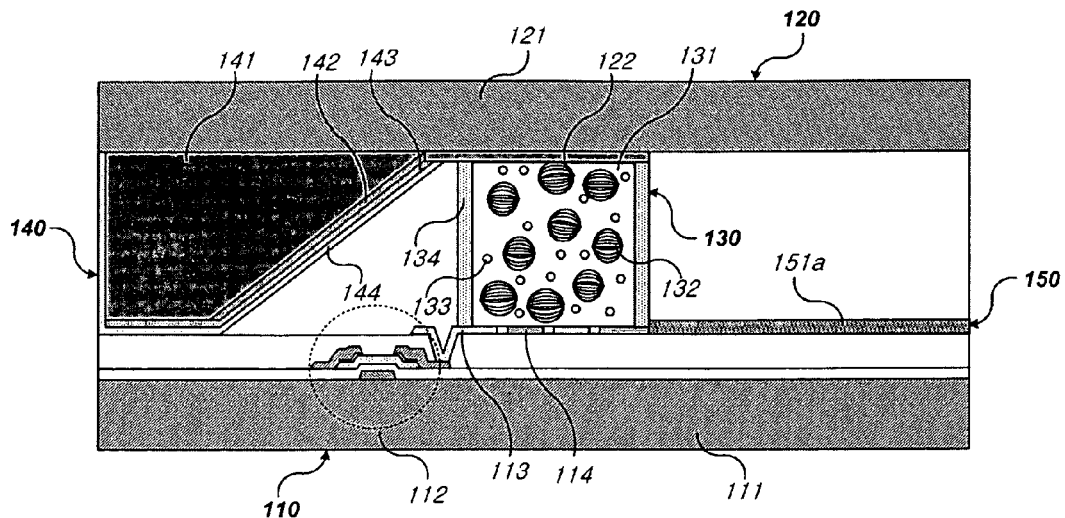
FIG. 6 is a vertical sectional view of a PDLC display according to a second embodiment of this document.

FIG. 6 is a vertical sectional view of a PDLC display according to a second embodiment of this document.

Referring to FIG. 6, the PDLC display according to the second embodiment of this document is substantially the same as the PDLC display according to the first embodiment of this document except that a floating metal 151a of a first reflection plate 150 is formed on and parallel to a rear substrate. In this embodiment, description on the same parts as that of the first embodiment is omitted for simplicity. In other words, the PDLC display according to the second embodiment of this document illustrates that the support layer may not be formed in the first reflection plate 150. The second embodiment of this document can be used when a PDLC display is fabricated simply.

Figure 7:
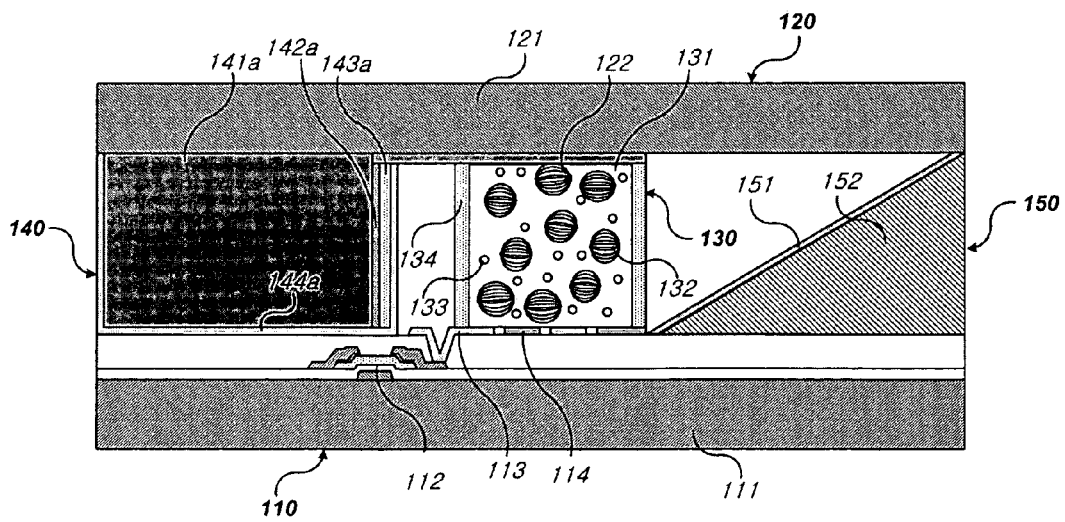
FIG. 7 is a vertical sectional view of a PDLC display according to a third embodiment of this document.

FIG. 7 is a vertical sectional view of a PDLC display according to a third embodiment of this document.

Referring to FIG. 7, the PDLC display according to the third embodiment of this document is substantially the same as the PDLC display according to the first embodiment of this document except that a black matrix 141a, a reflection plate 142a, a light-emitting layer 143a, and an ITO layer 144a of a light source 140 are not formed inclinedly with respect to a front substrate 120, but are formed vertically with respect to the front substrate 120. In this embodiment, description on the same parts as that of the first embodiment is omitted for simplicity. That is, the PDLC display according to the third embodiment of this document can be used when a PDLC display is fabricated simply.

Figure 8:
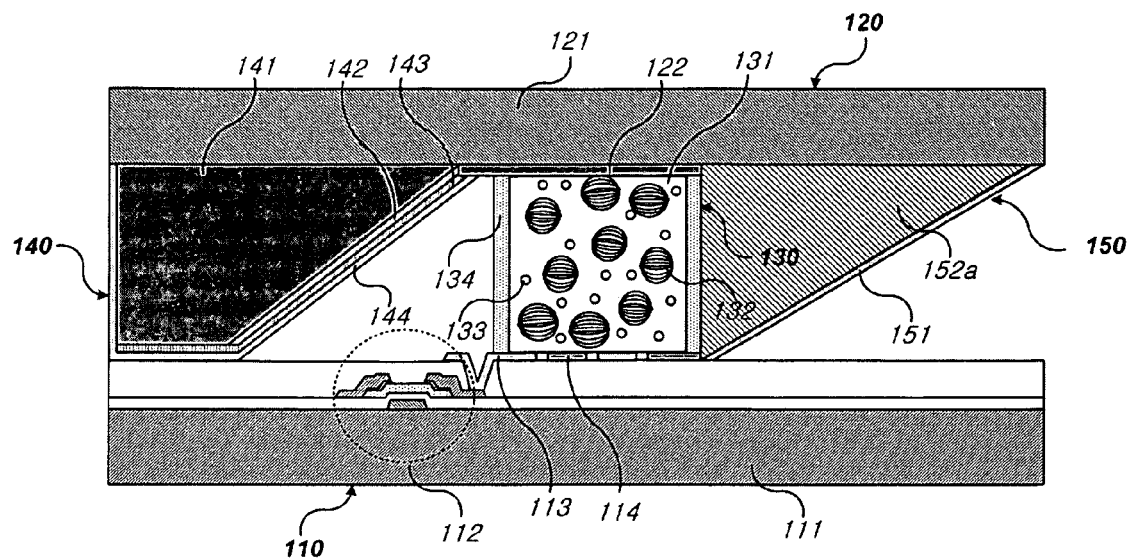
FIG. 8 is a vertical sectional view of a PDLC display according to a fourth embodiment of this document.

FIG. 8 is a vertical sectional view of a PDLC display according to a fourth embodiment of this document.

Referring to FIG. 8, the PDLC display according to the fourth embodiment of this document is substantially the same as the PDLC display according to the first embodiment of this document except that a support layer 152a of a first reflection plate 150 is formed on a front substrate 120 and a floating metal 151 is formed inclinedly with respect to the front substrate 120. In this embodiment, description on the same parts as that of the first embodiment is omitted for simplicity. In other words, the PDLC display according to the fourth embodiment of this document illustrates that the support layer 152a of the first reflection plate 150 is formed in the front substrate 120 not the rear substrate 110.

Figure 9:
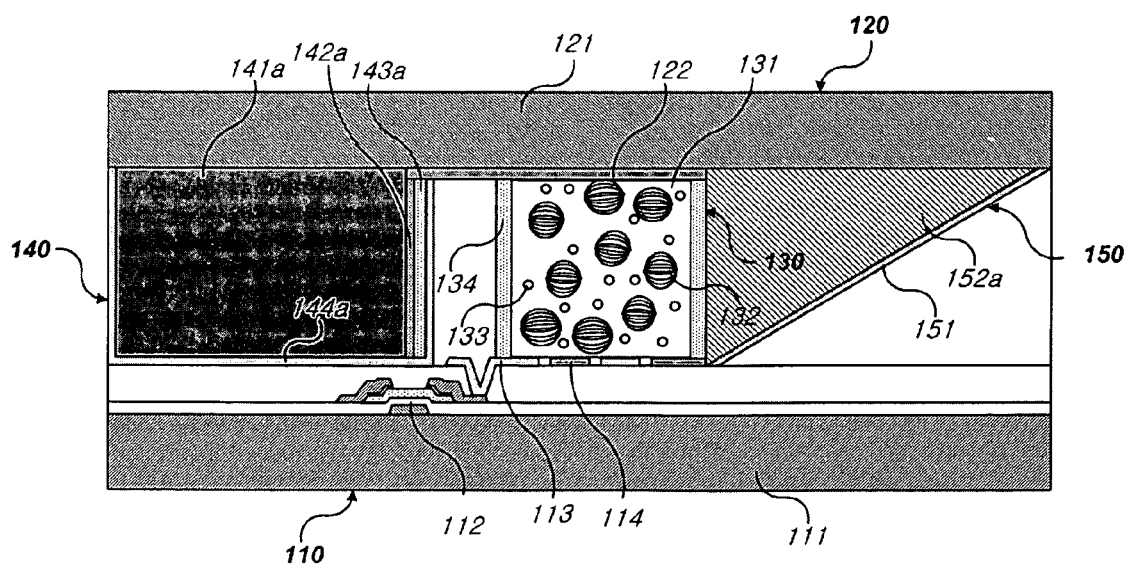
FIG. 9 is a vertical sectional view of a PDLC display according to a fifth embodiment of this document.

FIG. 9 is a vertical sectional view of a PDLC display according to a fifth embodiment of this document.

Referring to FIG. 9, the PDLC display according to the fifth embodiment of this document is substantially the same as the PDLC display according to the fourth embodiment of this document except that a black matrix 141a, a reflection plate 142a, a light-emitting layer 143a, and an ITO layer 144a of a light source 140 are not formed inclinedly with respect to a front substrate 120, but are formed vertically with respect to the front substrate 120. In this embodiment, description on the same parts as that of the fourth embodiment is omitted for simplicity. In other words, the PDLC display according to the fifth embodiment of this document can be used when a PDLC display is fabricated simply compared with the PDLC display according to the fourth embodiment of this document.

As can be seen from the above, the PDLC displays according to the first to fifth embodiments of this document have the same construction in that the PDLC layer 130 is formed only below the black matrix 122, the light source 140 instead of the existing backlight unit is formed on one side of the PDLC layer 130, and the first reflection plate 150 is formed on the other side of the PDLC layer 130.

Figure 10:
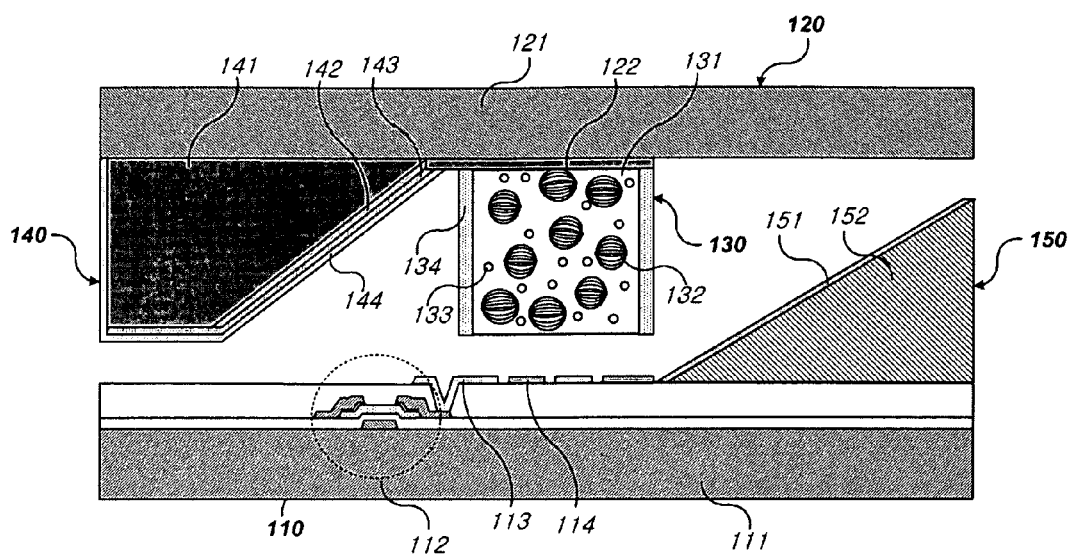
FIG. 10 is a view schematically illustrating a first embodiment of a method of fabricating a PDLC display according to this document.

FIG. 10 is a view schematically illustrating a first embodiment of a method of fabricating a PDLC display according to this document.

Referring to FIG. 10, the rear substrate 110 and the front substrate 120 are respectively formed, the PDLC layer 130 is formed over the rear substrate 110 or the front substrate 120, and the rear substrate 110 and the front substrate 120 are then coalesced together through a coalescence process, thereby completing a PDLC display.

First, the rear substrate 110 is fabricated through the following process. The TFT 112, the pixel electrode 113, and the common electrode 114 are formed over the glass substrate 111. The pixel electrode and the common electrode 113, 114 are electrodes for generating a horizontal electric field. In the first embodiment of the fabrication method of the PDLC display according to this document, the transparent resin layer 152 (that is, the support layer) to which the first reflection plate 150 is attached so that the transparent resin layer 152 is inclined with respect to the rear substrate 110 may be formed. More specifically, after the transparent resin layer 152 having a predetermined tilt angle is formed on the rear substrate 110 over which the TFT 112, the pixel electrode 113, and the common electrode 114 are formed, aluminum (Al) may be formed on the transparent resin layer 152 in order to form the floating metal 151 of the first reflection plate 150, but not limited thereto.

Next, the front substrate 120 is fabricated through the following process. The first black matrix 122 and the second black matrix 141 are formed on the second glass substrate 121. The first black matrix 122 and the second black matrix 141 may be formed at the same time or sequentially. The second reflection plate 142 is formed on the second black matrix 141 so that it is inclined with respect to the front substrate 120. The second reflection plate 142 may be made of aluminum (Al). The light-emitting layer 143 is formed on a front surface of the second reflection plate 142 and the ITO layer 144 is formed on an exposed front surface.

The PDLC layer 130 is formed below the black matrix 122 formed on the front substrate 120 so that it corresponds to the black matrix 122. The PDLC layer comprises the polymer matrix 131, the micro liquid crystal droplets 132 including the liquid crystal molecule particles, the pigment particles 133, and the photoresist walls 134. The PDLC layer 130 can be formed by applying an inkjet dropping process and a curing process sequentially. More specifically, the photoresist walls 134 may be formed on the first black matrix 122 and the PDLC layer 130 may be formed between the photoresist walls 134.

The formation process of the front substrate 120 and the formation process of the rear substrate 110 may be carried out separately. The front substrate 120 and the rear substrate 110 are then coalesced, thereby completing the fabrication process.

Meanwhile, a process of making vacuum spaces from the top of the TFT to the light source 140 and from the top of the floating metal 151 to the front substrate 120 may be performed additionally.

Figure 11:
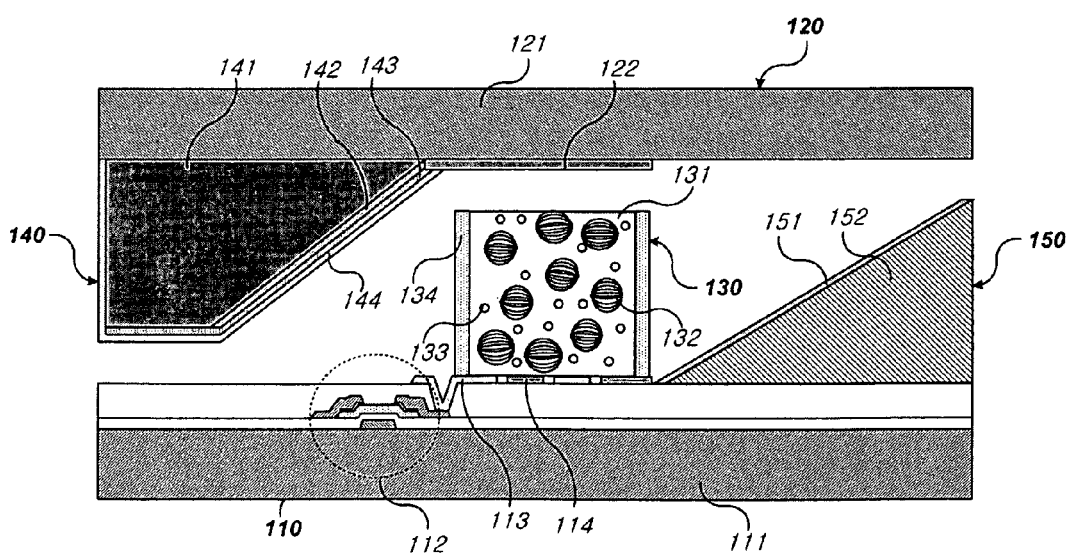
FIG. 11 is a view schematically illustrating a second embodiment of a method of fabricating a PDLC display according to this document.

FIG. 11 is a view schematically illustrating a second embodiment of a method of fabricating a PDLC display according to this document.

Referring to FIG. 11, the second embodiment of the fabrication method of the PDLC display according to this document is the same as the first embodiment of the fabrication method of the PDLC display according to this document shown in FIG. 10 except that the PDLC layer 130 is formed on the rear substrate 110. Thus, description on the same parts as that of the first embodiment is omitted for simplicity.

More specifically, the photoresist walls 134 are formed under the front substrate 120 so that they correspond to the first black matrix 122. And then the PDLC layer 130 is formed between the photoresist walls 134. The PDLC layer 130 can be formed by applying an inkjet dropping process and a curing process sequentially.

Figure 12:
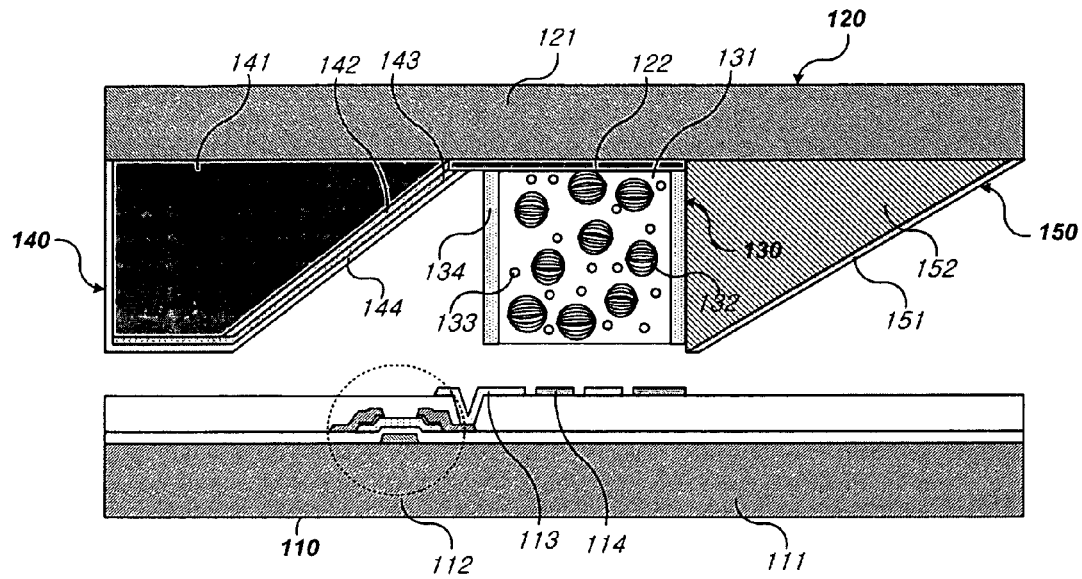
FIG. 12 is a view schematically illustrating a third embodiment of a method of fabricating a PDLC display according to this document.

FIG. 12 is a view schematically illustrating a third embodiment of a method of fabricating a PDLC display according to this document.

Referring to FIG. 12, the third embodiment of the fabrication method of the PDLC display according to this document is the same as the first embodiment of the fabrication method of the PDLC display according to this document shown in FIG. 10 except that the first reflection plate 150 is formed on the front substrate 120. Thus, description on the same parts as that of the first embodiment is omitted for simplicity.

More specifically, the transparent resin layer 152 (that is, the support layer) to which the first reflection plate 150 is attached is formed so that the layer 152 is inclined with respect to the front substrate 120. That is, after the transparent resin layer 152 having a predetermined tilt angle is formed on the front substrate 120 on which the first black matrix 122 and the light source 140 are formed, aluminum (Al) may be formed on the transparent resin layer 152 in order to form the floating metal 151 of the first reflection plate 150, but not limited thereto.

Thereafter, after the PDLC layer 130 is formed in a state where the first black matrix 122, the light source 140, and then the first reflection plate 150 are formed. Lastly, the rear substrate 110 and the front substrate 120 are coalesced together, thereby completing the PDLC display.

Figure 13:
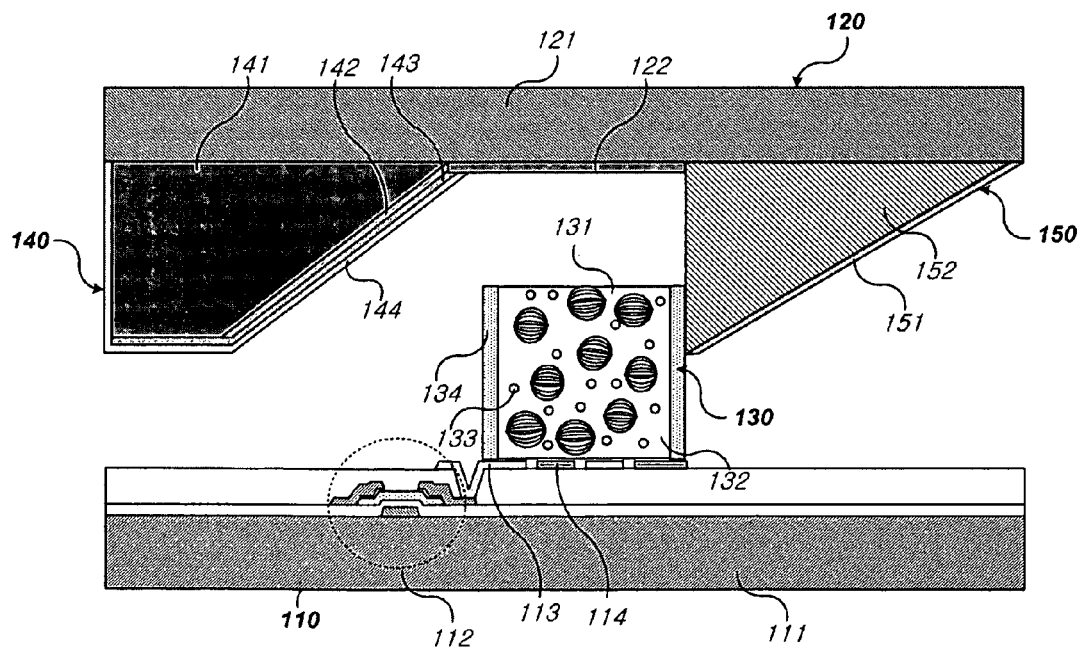
FIG. 13 is a view schematically illustrating a fourth embodiment of a method of fabricating a PDLC display according to this document.

FIG. 13 is a view schematically illustrating a fourth embodiment of a method of fabricating a PDLC display according to this document.

Referring to FIG. 13, the fourth embodiment of the fabrication method of the PDLC display according to this document is the same as the second embodiment of the fabrication method of the PDLC display according to this document shown in FIG. 11 except that the first reflection plate 150 is formed on the front substrate 120. Thus, description on the same parts as that of the second embodiment is omitted for simplicity.

More specifically, the transparent resin layer 152 (that is, the support layer) to which the first reflection plate 150 is attached is formed so that the transparent resin layer 152 is inclined with respect to the front substrate 120. In reality, after the transparent resin layer 152 having a predetermined tilt angle is formed on the front substrate 120 on which the first black matrix 122 and the light source 140 are formed, aluminum (Al) may be formed on the transparent resin layer 152 in order to form the floating metal 151 of the first reflection plate 150, but not limited thereto.

The rear substrate 110 and the front substrate 120 are coalesced together, thereby completing the PDLC display.

In accordance with the embodiments of this document, the existing backlight unit is not used and the light source is formed on the side of the PDLC layer. Accordingly, a simplified characteristic in terms of the design, process, and material can be obtained.

In accordance with the embodiments of this document, a cheap and high-quality display characteristic can be obtained while maintaining a high transmittance and viewing angle characteristic of a general PDLC display. That is, since the PDLC layer is formed below the black matrix, the PDLC layer cannot be seen directly from the front of a screen and therefore a dark dignity can be improved.

In accordance with the embodiments of this document, the contrast ratio can be improved by forming the PDLC layer to have a high panel gap. Further, the response speed and the driving voltage can be improved by forming the PDLC layer to have a low panel gap. In other words, to improve the contrast ratio, the PDLC layer can be formed to have a high panel gap. To improve the response speed and the driving voltage, the PDLC layer can be formed to have a low panel gap.

In accordance with the embodiments of this document, the process can be simplified and the production cost can be saved since the process of this document can be carried out without coating of an orientation film, rubbing, and a polarized plate attachment process.

In accordance with the embodiments of this document, the material cost can be saved since a polyimide solution (that is, an orientation agent), a polarized plate, and a color filter are not used, and the use of liquid crystals can be reduced.

In accordance with the embodiments of this document, a wide viewing angle and a high luminance can be implemented. Further, the driving voltage and the response speed or the contrast ratio can be controlled appropriately compared with the existing PDLC display.

While this document has been described in connection with what is presently considered to be practical exemplary embodiments, it is to be understood that this document is not limited to the disclosed embodiments, but, on the contrary, is intended to cover various modifications and equivalent arrangements included within the spirit and scope of the appended claims.

What is claimed is:

1. A polymer dispersed liquid crystal (PDLC) display, comprising:
    a rear substrate over which a thin film transistor (TFT), a first electrode, and a second electrode are formed;
    a front substrate apart from the rear substrate and having a first black matrix formed thereon corresponding to a region where the TFT is formed;
    a PDLC layer disposed below the first black matrix and formed between the front and rear substrates;
    a light source disposed on one side of the PDLC layer and configured to provide light to the side of the PDLC layer; and
    a first reflection plate formed on the other side of the PDLC layer and configured to reflect light incident via the PDLC layer,
    wherein the light source comprises a second black matrix formed on the front substrate, a second reflection plate formed on the second black matrix, and a light-emitting layer formed on the second reflection plate which is configured to reflect light emitted from the light-emitting layer to the PDLC layer.

2. The PDLC display of claim 1, wherein the light source comprises a self-illuminant.

3. The PDLC display of claim 2, wherein the self-illuminant comprises an organic electroluminescent light-emitting diode (OLED).

4. The PDLC display of claim 1, wherein the light-emitting layer is formed on the second black matrix inclinedly with respect to the front substrate.

5. The PDLC display of claim 1, wherein the layer is formed on the second black matrix vertically to the front substrate.

6. The PDLC display of claim 1, further comprising an indium tin oxide (ITO) layer formed on a front surface of the light-emitting layer and configured to protect the light-emitting layer.

7. The PDLC display of claim 6, wherein the ITO layer is used as an electrode for applying a power source to the light-emitting layer.

8. The PDLC display of claim 1, wherein a pixel electrode and a common electrode of the rear substrate generate a horizontal electric field in the PDLC layer.

9. The PDLC display of claim 8, wherein the PDLC layer scatters lateral light provided from the light source, and provides the scattered light to the first reflection plate when a voltage is applied between the pixel electrode and the common electrode.

10. The PDLC display of claim 8, wherein the PDLC layer blocks lateral light provided from the light source when a voltage is not applied between the pixel electrode and the common electrode.

11. The PDLC display of claim 1, wherein the PDLC layer comprises:
    a polymer matrix;
    micro liquid crystal droplets dispersed within the polymer matrix; and
    liquid crystal molecule particles intervened within the micro liquid crystal droplets in a capsule shape.

12. The PDLC display of claim 11, wherein the PDLC layer further comprises pigment particles added to the polymer matrix and configured to represent colors.

13. The PDLC display of claim 11, further comprising walls formed on both sides of the PDLC layer and configured for receiving of the PDLCs.

14. The PDLC display of claim 13, wherein the walls comprise a photoresist (PR).

15. The PDLC display of claim 1, wherein the PDLC layer has a projection shape for forming a cell gap.

16. The PDLC display of claim 1, wherein the first reflection plate comprises:
    a floating metal of a reflector having a non-electrode property, for reflecting light incident from the PDLC layer; and
    a support layer supporting the floating metal.

17. The PDLC display of claim 16, wherein the floating metal is formed on the support layer at a predetermined tilt angle with respect to the front substrate.

18. The PDLC display of claim 16, wherein the support layer comprises a transparent resin.

19. The PDLC display of claim 16, wherein the floating metal is formed on the support layer vertically to the front substrate.

* * * * *